United States Patent
Martin

[19]

[11] Patent Number: 5,896,623
[45] Date of Patent: Apr. 27, 1999

[54] REUSABLE CABLE BINDER

[76] Inventor: Mark Martin, 140 Wyatt Cir., Pleasant Hill, Calif. 94523

[21] Appl. No.: 09/114,800

[22] Filed: Jul. 13, 1998

Related U.S. Application Data

[60] Provisional application No. 60/053,298, Jul. 21, 1997.
[51] Int. Cl.⁶ .................................................. B65D 63/00
[52] U.S. Cl. ........................ 24/16 PB; 24/115 G; 24/3.13
[58] Field of Search ............................... 24/16 PB, 16 R, 24/30 SP, 17 AP, 3.4, 3.13, 115 G, 136 R; 248/74.3; 292/325

[56] References Cited

U.S. PATENT DOCUMENTS

| | | | |
|---|---|---|---|
| 2,572,889 | 10/1951 | Strykower | 24/3.4 X |
| 3,081,781 | 3/1963 | Stermer | 24/17 AP X |
| 4,159,792 | 7/1979 | Siegal | 24/3.13 X |
| 4,498,507 | 2/1985 | Thompson . | |
| 4,881,302 | 11/1989 | Lee | 24/115 G X |
| 5,092,018 | 3/1992 | Seron | 24/3.13 X |
| 5,193,251 | 3/1993 | Fortsch . | |
| 5,379,494 | 1/1995 | Shirakawa . | |
| 5,465,466 | 11/1995 | Napier | 24/3.13 X |
| 5,511,293 | 4/1996 | Hubbard, Jr. et al. | 24/16 PB X |
| 5,600,873 | 2/1997 | May | 24/3.13 X |
| 5,611,118 | 3/1997 | Ibbee | 24/115 G X |
| 5,697,128 | 12/1997 | Peregrine | 24/115 G |

*Primary Examiner*—James R. Brittain
*Assistant Examiner*—Robert J. Sandy
*Attorney, Agent, or Firm*—Thomas R. Lampe

[57] ABSTRACT

A reusable cable binder including a length of shock cord, the ends of which are fixed in a terminating device, forming a loop, a bead captive on said cord, and a cord lock captive on said loop between said terminating device and said bead.

9 Claims, 2 Drawing Sheets

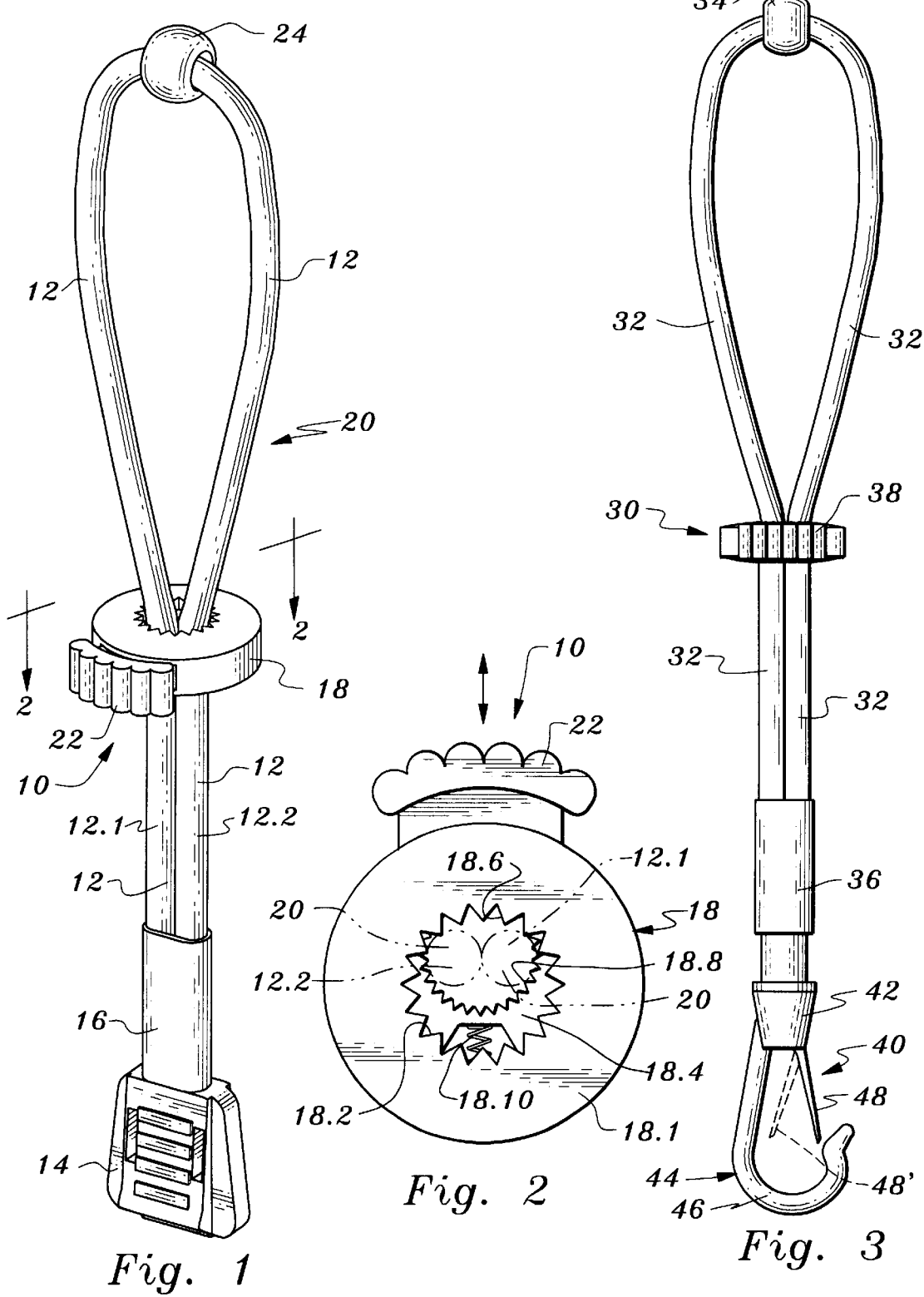

REUSABLE CABLE BINDER

This application claims the benefit of United States Provisional Application Ser. No. 60/053,298, filed Jul. 21, 1997.

TECHNICAL FIELD

This invention relates to cable binders, and more particularly to reusable cable binders of the type which are adapted for use in temporarily binding together the several cables used in connection with a particular set or related plurality of cooperating electronic devices, e.g., a personal computer and its associated monitor and printer, during the transportation or storage thereof.

BACKGROUND OF THE INVENTION

Many cable binding devices and methods of using particular ones of the same are known in the prior art. In general, such cable binding devices fall into two categories.

The first such category is that of permanent cable binding devices, such as those used in binding together the cables which jointly traverse particular legs of the cable harnesses contained within certain electronic devices.

The second one of these categories is that of temporary or reusable cable binding devices, such as are used for binding together the set of cables used in connection with a particular set of electronic devices.

The cable binders of the present invention fall within said second category.

It is to be understood, however, that the utility of the cable binders of this invention is not limited to their use in connection with the interconnecting cables of a particular set or plurality of operationally-related electronic devices. Indeed, the utility of the cable binders of the present invention is not limited to their use in connection with electrical or electronic equipment and the related cables.

The following existing patents relate generally to cable ties or binders: U.S. Pat. No. 4,498,507, issued Feb. 13, 1985, U.S. Pat. No. 5,193,251, issued Mar. 16, 1993, and U.S. Pat. No. 5,379,494, issued Jan. 10, 1995. These patents do not disclose the invention disclosed and claimed herein.

No representation or admission is made that any of the above-cited United States patents is part of the prior art, or that a search has been made, or that no more pertinent information exists.

The term "prior art" as used herein or in any statement made by or on behalf of applicant means only that any document or thing referred to as prior art bears, directly or inferentially, a date which is earlier than the effective filing date hereof.

DISCLOSURE OF INVENTION

It is an object of the present invention to provide reusable cable binders which are capable of binding together both small numbers of cables and large numbers of cables.

It is another object of the present invention to provide reusable cable binders by means of which bundles of cables may be rapidly and easily bound together.

It is yet another object of the present invention to provide reusable cable binders, the operation of which does not require the tying of a knot or knots.

It is a further object of the present invention to provide reusable cable binders having at least two modes of operation.

It is a yet further object of the present invention to provide reusable cable binders having a first mode of operation which is extremely rapid and efficient, but which requires that the binder be passed over one end of the bundle or set of cables which are to be bound together.

It is another object of the present invention to provide reusable cable binders having a second mode of operation which permits the binder to be passed around a central portion only of the bundle of cables to be bound together, without passing the binder over an end of the cable bundle.

It is yet another object of the present invention to provide reusable cable binders which are economically constructable from readily available parts, i.e., the construction of which binders does not require the manufacture of specialized parts.

It is a further object of the present invention to provide reusable cable binders which are readily adaptable to special uses without the manufacture of specialized parts to be incorporated herein.

The present invention comprises the apparatus embodying features of construction, combinations of elements, and arrangements of parts, all as exemplified in the following disclosure, and the methods of use of said apparatus exemplified in the following disclosure, and the scope of my invention will be indicated in the claims appended to this specification.

In accordance with a principal feature of the present invention a reusable cable binder thereof is comprised of a length of elastic shock cord of the type sometimes referred to as "bungee cord", the ends of said length of shock cord being brought together and joined together by means of a terminating device or termination, thereby forming a closed loop of shock cord.

In accordance with another principal feature of the present invention said length of shock cord is passed through a bead before said closed loop of shock cord is closed by the associated terminating device, and thus said bead is captive on said loop of cord but freely movable along said loop of cord.

In accordance with yet another principal feature of the present invention a cord lock of well known type is passed over both ends of said length of shock cord before said terminating device is clamped to said ends of said length of shock cord.

In accordance with another principal feature of the present invention, in the course of fabricating a reusable cable binder of the invention a length of shock cord is threaded through its associated bead, both ends of the length of shock cord are passed through the associated cord lock, and then the ends of the length of shock cord are joined together by the associated terminating device, whereby said cord lock and said bead are captive on the resulting loop of shock cord, with said bead being remote from said terminating device and said cord lock being located between said bead and said terminating device.

Other features, advantages, and objects of the present invention will become apparent with reference to the following description and accompanying drawings.

BRIEF DESCRIPTION OF DRAWINGS

FIG. 1 is a perspective view of a reusable cable binder of a first preferred embodiment of the present invention;

FIG. 2 is a cross-sectional view of the reusable cable binder of the first preferred embodiment of the invention as shown in FIG. 1, taken on plane 2—2 of FIG. 1;

FIG. 3 is an elevational view of a reusable cable binder of the second preferred embodiment of the present invention;

MODES FOR CARRYING OUT THE INVENTION

Figure 4:
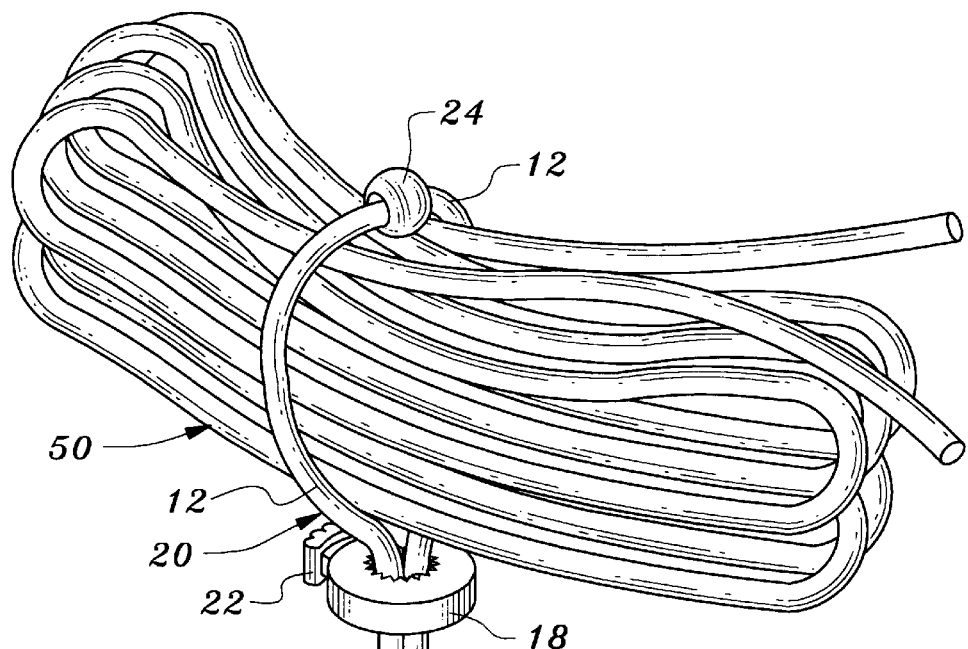
FIG. 4 illustrates the first mode of use of the present invention as carried out with the reusable cable binder of the first preferred embodiment of the invention.

Referring now to FIG. 1, there is shown a reusable cable binder 10 constructed in accordance with the first preferred embodiment of the present invention.

As seen in FIG. 1, binder 10 is comprised of a length 12 of shock cord of the type sometimes called "bungee cord", which can be purchased, for example, from the American Cord and Webbing Corporation of Woonsocket, R.I.

In the first preferred embodiment of the invention, shock cord 12 is preferably of smaller diameter than the shock cord commonly used in camping, loading vehicles, and many other applications, i.e., it is preferably of approximately ⅛ inch diameter.

It is to be understood that shock cord length 12 is not integrally joined at its ends to form a continuous, uninterrupted closed loop, but rather that the ends of cord length 12 extend downwardly (in FIG. 1) parallel to each other and in direct mutual side-by-side contact.

As further seen in FIG. 1, the parallel, mutually-tangent ends of shock cord length 12 extend into and at least partially through a terminating device or termination 14.

As yet further seen in FIG. 1, the ends of shock cord length 12 are contained within the body of terminating device or termination 14.

Terminating devices such as termination 14 are specifically provided and commercially available for the purpose of joining together pieces of shock cord, or the ends of a single piece of shock cord. Such terminations may be purchased, for example, from the NBC Fastening Systems Division of the Nylon Molding Corporation, Monrovia, Calif.

Such terminating devices are available in a wide variety of styles, as may be seen by comparison of FIG. 1 and FIG. 3.

As also seen in FIG. 1, the parts of the ends of shock cord length 12 immediately above termination 14 are contained in a sheath 16 which prevents the formation of a sharp bend in shock cord 12, and thus prevents the distortion or breaking of shock cord 12 at the point where its ends enter termination 14.

The method and means of closing and locking each termination 14 about the ends of its associated shock cord length 12, where not obvious, will be provided by the manufacturer of termination 14, and are known in the prior art.

When such methods and means have been applied to any particular length of shock cord 12 and its associated termination 14 and sheath 16, the ends of shock cord length 12 will be permanently held in termination 14 with sheath 16 surrounding the portions of the ends of shock cord length 12 immediately above and below the point of entry of shock cord length 12 into termination 14.

Referring again to FIG. 1, and comparing the same with FIG. 2, it will be seen that a cord lock 18 of well known type completely surrounds both legs 12.1, 12.2 of the loop 20 of shock cord length 12 formed by the affixation of termination 14 to the respective ends of shock cord length 12 as shown in FIG. 1 and described in the present specification.

Cord lock 18 is provided with a spring-loaded locking arrangement shown generally in FIG. 2 which is adapted for graspingly engaging loop 20, or releasing loop 20 when actuator 22 is manually depressed into the body of cord lock 18.

As seen in FIG. 2, cord lock 18 is comprised of a body 18.1 which is itself provided with a central opening 18.2. Part of the wall of opening 18.2 serves as one of the grasping jaws of cord lock 18.

A moveable member 18.4 is slidably contained within body 18.1 of core lock 18, and its movement is directly controlled by actuator 22.

As will now be evident to those having ordinary skill in the art, informed by the present disclosure, an upper portion 18.6 of the said wall of opening 18.2 serves as the upper jaw of cord lock 18, and a portion 18.8 of moving member 18.4 serves as the lower jaw of cord lock 18. Further, manually depressing actuator 22 into body 18.1 of cord lock 18 causes jaws 18.6 and 18.8 to become separated, against the urging of jaw closure spring 18.10.

As seen in FIG. 2, both legs of loop 20 pass through opening 18.2, and the portions 12.1, 12.2 of loop 20 (shock cord length 12) contained in opening 18.2 are securely locked therein when actuator 22 is released. When actuator 22 is depressed, cord lock 18 is slidably movable along loop 20.

In accordance with a principal feature of the present invention, a bead 24 having an opening therein receives loop 20 and is captive on loop 20, being slidable with respect thereto, and cord lock 18 is located between termination 14 and bead 24, whereby cord lock 18 is captive on loop 20, i.e., is prevented from escaping therefrom. Thus, cord lock 18 is freely slidable along loop 20 when actuator 22 is manually depressed into body 18.1.

Cord locks of the type described in detail above are commercially available, for example, from the American Cord and Webbing Corporation of Woonsocket, R.I.

Referring now to FIG. 3, there is shown a reusable cable binder 30 of the second preferred embodiment of the invention.

As will be evident to those having ordinary skill in the art, informed by the present disclosure, shock cord length 32 of the second preferred embodiment is substantially identical to shock cord length 12 of the first preferred embodiment as shown in FIG. 1.

Further, bead 34 of the second preferred embodiment (FIG. 3) is substantially identical to bead 24 of the first preferred embodiment (FIG. 1) and cord lock 38 of the second preferred embodiment (FIG. 3) is substantially identical to cord lock 18 of the first preferred embodiment (FIG. 1).

Also, sheath 36 of the second preferred embodiment (FIG. 3) is substantially identical to sheath 16 of the first preferred embodiment (FIG. 1).

As may be seen by comparison of FIGS. 1 and 3, termination 40 of the second preferred embodiment is substantially different from termination 14 of the first preferred embodiment (FIG. 1).

As seen in FIG. 3, termination 40 is comprised of a body member 42 in which the respective ends of shock cord length 32 terminate and a spring-loaded clasp 44, which is comprised of hook 46 and tongue 48.

As indicated in FIG. 3, tongue 48 is spring-loaded into its outermost position (solid lines) but is momentarily manually depressible to its innermost position 48' (dashed lines), whereby to admit items to be joined to cable binder 30 into the embrace of hook 46, in the well known manner.

Referring now to FIG. 4, there is illustrated a first mode of use of cable binders of the present invention, which mode of use is a principal feature of the present invention.

As seen in FIG. 4, a bundle 50 of cables is bound together by a reusable cable binder 10 of the first preferred embodiment of the present invention.

It is to be understood that binder 10 shown in FIG. 4 is substantially identical to binder 10 shown in FIG. 1, and therefore that the reference numerals applied to binder 10 in FIG. 4 should be understood by reference to the description drawn to the same elements hereinabove.

It is also to be understood that bundle 50 may, in application of the first mode of use of the present invention, be comprised of a plurality of different cables each of which may be provided with terminations adapted for use in connection with a particular pair of electronic devices.

The first mode of use of the present invention also has application when things other than electrical cords or cables are being bound by a binder of the present invention.

In accordance with the first mode of use of the present invention binder 10 is at first separated from cable bundle 50.

At that time the user depresses actuator 22 and then draws cord lock 18 over cable loop 20 until it is close to sheath 16.

Loop 20 is then passed over one end of bundle 50 and located thereon as desired.

The user then depresses actuator 22 and then moves cord lock 18 as close to bundle 50 as possible. Upon the release of actuator 22 bundle 50 is tightly bound in binder 10 as shown in FIG. 4.

Figure 5:
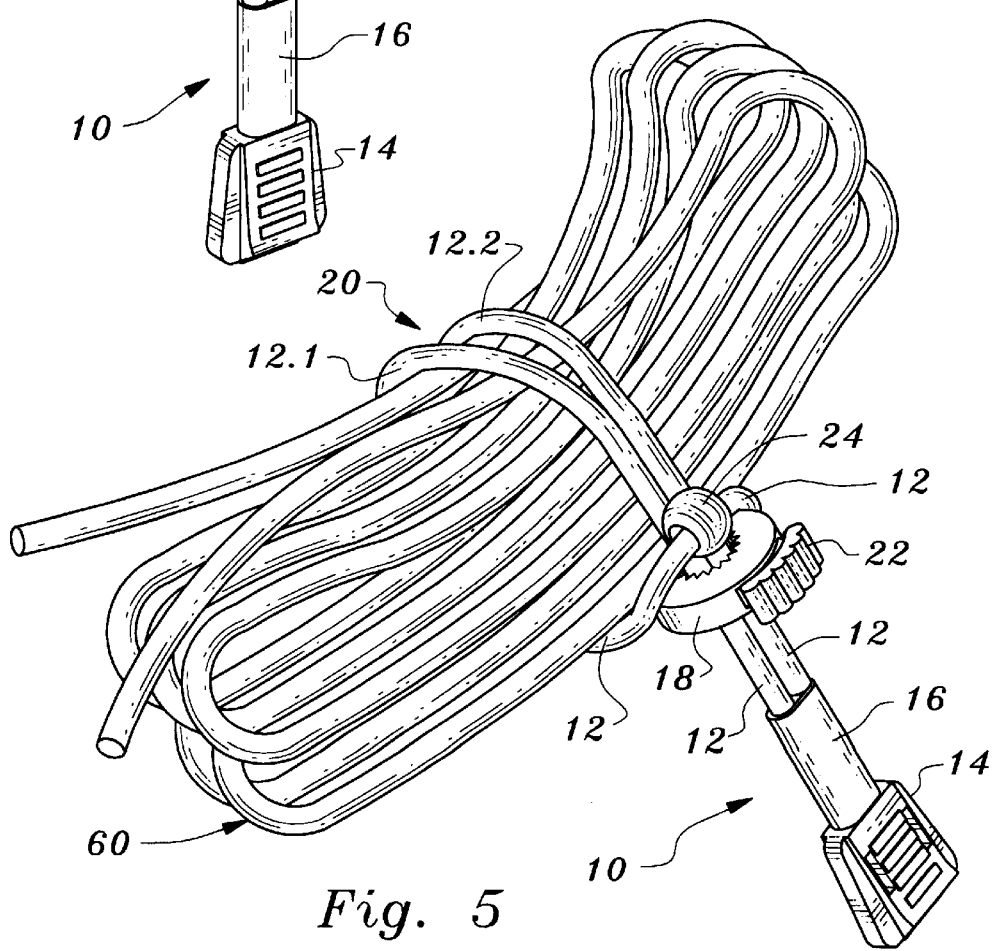
FIG. 5 illustrates the second mode of use of the invention as carried out with the reusable cable binder of the first preferred embodiment thereof.

Referring now to FIG. 5, there is illustrated a second mode of use of cable binders of the present invention, which mode of use is a principal feature of the invention.

As seen in FIG. 5, a bundle 60 of cables is bound together by a reusable cable binder 10 of the first preferred embodiment of the present invention.

It is to be understood that binder 10 shown in FIG. 5 is substantially identical to binder 10 shown in FIG. 1, and thus that the reference numerals applied to binder 10 in FIG. 5 should be understood by reference to the description drawn to the same elements hereinabove in connection with FIG. 1.

It is also to be understood that binder 16 may, in application of the second mode of use of the present invention, be comprised of a plurality of different cables each of which may be provided with terminations for use in connection with a particular pair of electronic devices.

The second mode of use of the present invention also has application when things other than electronic cords or cables are being bound.

In accordance with the second mode of use of the present invention binder 10 is at first separate from cable bundle 60. At that time the user depresses actuator 22, and then draws cord lock 18 over cable loop 20 until it is as close to sheath 16 as possible.

Bead 24 is then manually held in the position shown in FIG. 5, and terminating device 14 is passed under bundle 60, and thence behind and over the top of bundle 60.

Terminating device 14, cord lock 18 and the associated parts of shock cord length 12 are then passed between bead 24 and its associated part of bundle 60, until terminating device 14 and cord lock 18 have both passed completely between bead 24 and bundle 60.

The user then depresses actuator 22 and moves cord lock 18 toward bead 24 until two portions 12.1, 12.2 of shock cord length 12 are tightly locked around bundle 60.

When actuator 22 is then released, said two portions 12.1, 12.2 of shock cord length 12 are tightly locked around bundle 60 as shown in FIG. 5 with bead 24 and terminating device 14 engaging to maintain the wrapped configuration.

It will thus be seen that the objects set forth above, among those made apparent from the preceding description, are efficiently attained, and since certain changes may be made in the above constructions and the methods carried out thereby without departing from the scope of the present invention it is intended that all matter contained in the above description or shown in the accompanying drawings shall be interpreted as illustrative only, and not in a limiting sense.

It is also to be understood that the following claims are intended to cover all the generic and specific features of the invention hereindescribed, and all statements of the scope of the invention which, as a matter of language, might be said to fall therebetween.

I claim:

1. A reusable cable binder comprising in combination:

a length of shock cord having two ends;

a terminating device joining the ends of said length of shock cord to form a loop in said shock cord and maintain said ends in fixed relative positions and closely adjacent to one another;

a bead captive on said shock cord; and a cord lock having a cord lock opening receiving said loop located between said bead and said terminating device, said cord lock being selectively manually releasable from locking engagement with said loop, whereby said cord lock is selectively positionable at different positions along said loop between said bead and said terminating device.

2. The reusable cable binder according to claim 1 wherein said terminating device includes an auxiliary fastening device for fastening an object to said cable binder.

3. The reusable cable binder according to claim 2 wherein said auxiliary fastening device comprises a clasp including a spring-loaded retainer.

4. The reusable cable binder according to claim 2 wherein said cord lock includes a cord lock body, a first gripping jaw, a second gripping jaw movably mounted in the cord lock body and slidable therein relative to said first gripping jaw, and spring means resiliently urging said second gripping jaw toward said first gripping jaw.

5. The reusable cable binder according to claim 1 wherein said bead defines a bead opening and wherein said shock cord extends through said bead opening.

6. The reusable cable binder according to claim 1 additionally comprising a sheath extending about portions of said ends to maintain said portions straight and parallel.

7. The reusable cable binder according to claim 6 wherein said sheath extends away from said terminating device and engages said terminating device.

8. The reusable cable binder according to claim 1 wherein said bead and said terminating device are diametrically positioned on said loop.

9. The reusable cable binder according to claim 8 wherein said bead and said terminating device are engageable when said cable binder is configured to wrap about cables on other objects to maintain the reusable cable binder wrapped thereabout.

\* \* \* \* \*